Aug. 23, 1938.   H. J. HORN ET AL   2,127,598
VEHICLE WHEEL
Filed May 11, 1936   2 Sheets-Sheet 1
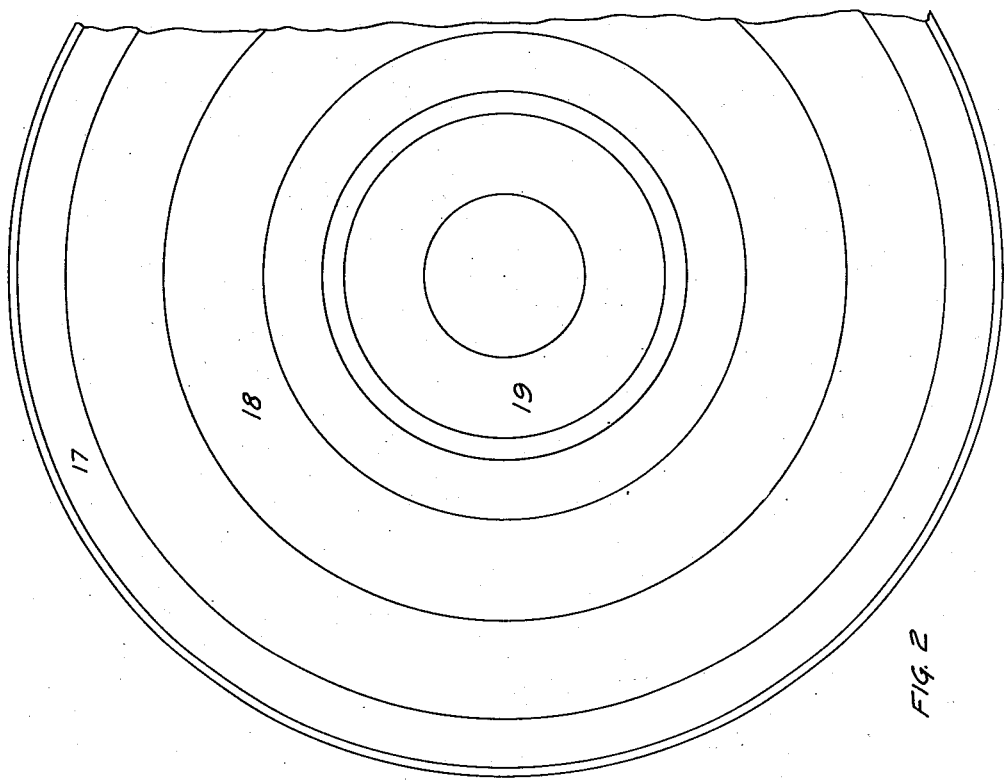
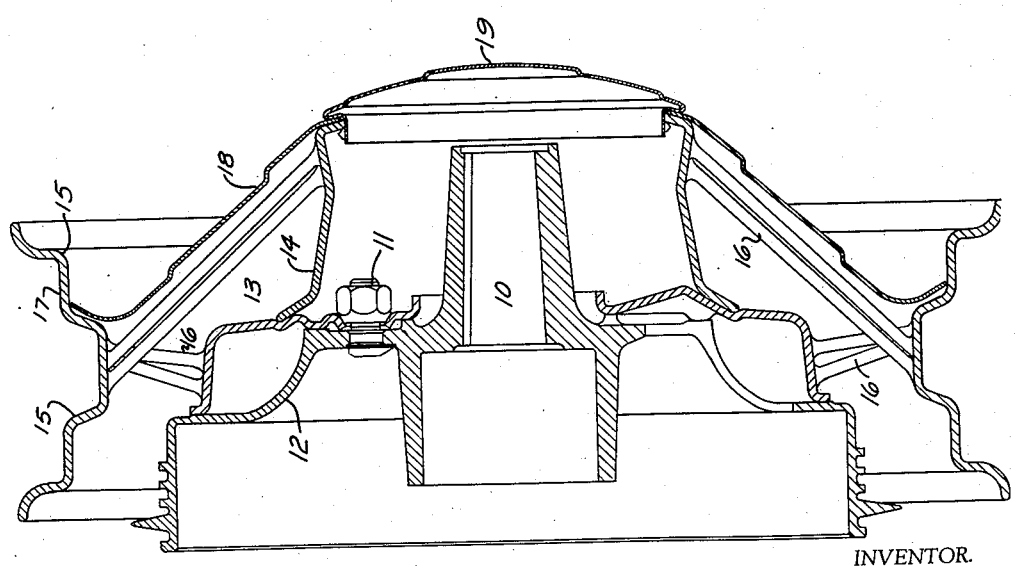
FIG. 2
FIG. 1
INVENTOR.
HARRY J. HORN
and
HAROLD G. AXTMANN
BY
Carroll R. Taber
ATTORNEY.

Aug. 23, 1938.   H. J. HORN ET AL   2,127,598
VEHICLE WHEEL
Filed May 11, 1936   2 Sheets-Sheet 2
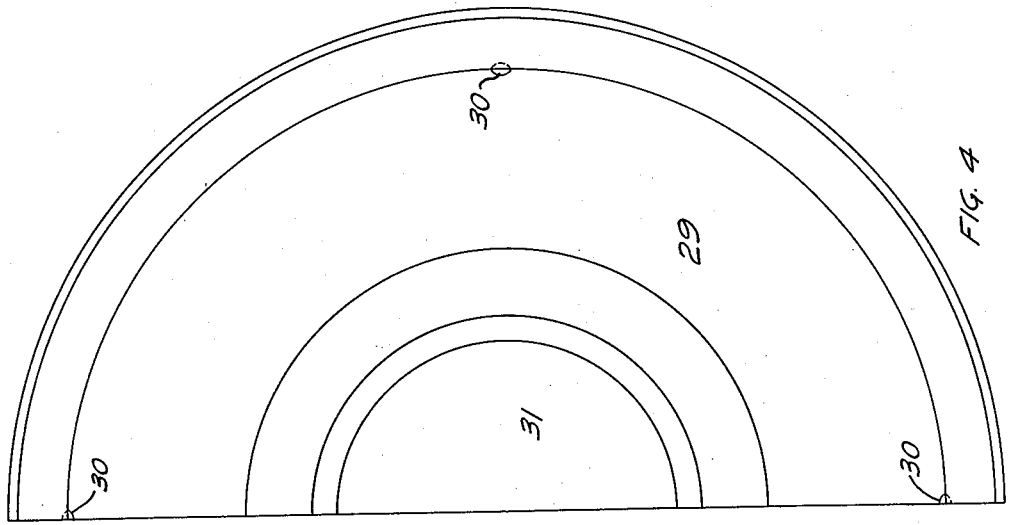
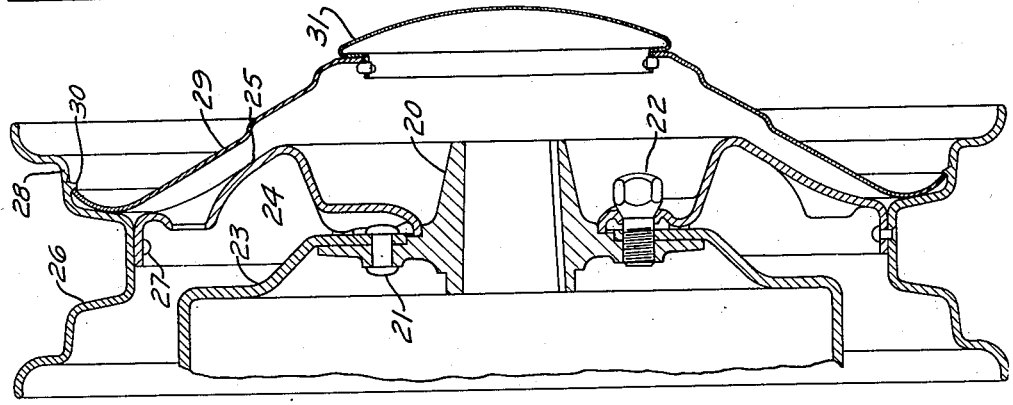
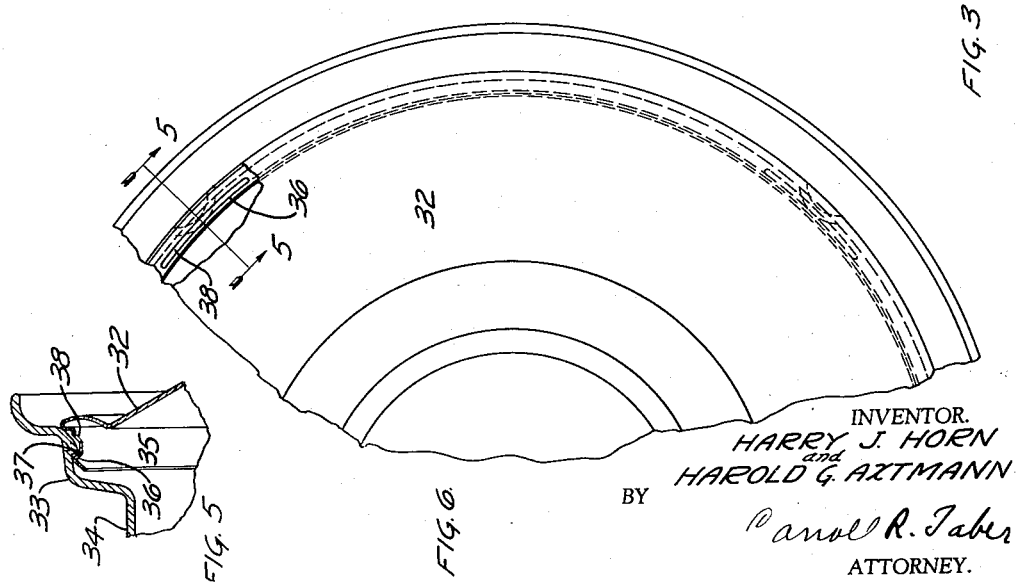
INVENTOR.
HARRY J. HORN
and
HAROLD G. AZTMANN
BY
ATTORNEY.

Patented Aug. 23, 1938

2,127,598

UNITED STATES PATENT OFFICE 2,127,598

VEHICLE WHEEL

Harry J. Horn, Lansing, and Harold G. Axtmann, Dearborn, Mich., assignors to Motor Wheel Corporation, Lansing, Mich., a corporation of Michigan Application May 11, 1936, Serial No. 78,960

5 Claims. (Cl. 301—37)

This invention relates to vehicle wheels and more particularly to the combination with a wheel rim of an ornamental wheel cover and novel means for attaching the cover to the rim.

Illustrative embodiments of the invention are shown in the accompanying drawings wherein:

Figure 1 is a sectional view of a conventional wire wheel having an ornamental cover secured thereto through engagement with the rim forming a part thereof;

Figure 2 is a partial front view in elevation of the construction shown in Figure 1;

Figure 3 is a sectional view of a conventional form of metal wheel having an ornamental cover secured thereto through a slightly modified form of engagement with the rim constituting a part thereof;

Figure 4 is a partial front view of the wheel construction shown in Figure 3;

Figure 5 is a fragmentary sectional view of a conventional rim and cover construction illustrating a still further modified manner of securing the cover to the rim; and Figure 6 is a partial front view of the rim and cover construction illustrated in Figure 5.

The wheel shown in Figure 1 comprises a conventional hub construction 10 to which is demountably secured by means of the stud bolt assemblies 11 a brake drum 12 and a wire wheel generally indicated at 13. The wire wheel includes a hub shell 14 and a conventional drop center rim 15 arranged in spaced concentric relation and secured to each other through means of the spokes 16.

The rim 15 is provided with seats 17 at the opposite sides thereof in the form of substantially axially extending annular walls. An ornamental cover 18 of generally conical formation is positioned to conceal the central portion of the wheel including the spokes 16. The cover is formed with a continuous peripheral edge of a normal diameter slightly greater than the internal diameter of the annular wall 17 of rim 15. Adjacent its periphery the cover 18 is flared or reversely curved as clearly shown in Figure 1.

The cover 18 is formed of sufficiently flexible material to permit the peripheral edge thereof to be pressed inside of the annular wall 17. When the cover is pressed into the position shown in Figure 1 its tendency to resume its normal diameter causes its peripheral edge to grip or bite into the annular wall 17. When the cover is formed with a reversely curved portion against its periphery this gripping action is sufficient to secure the cover to the wheel without the use of any other securing means.

The rigidity of the cover, when thus secured to the rim, is further assured by forming the central portion of the cover to engage the forward edge of the hub shell 14. Preferably the cover is formed with a central opening registering with the conventional opening in hub shell 14 whereby a hub cap 19 may be secured to the hub shell 14 in the same manner as would be possible if the ornamental cover 18 were not secured to the wheel.

The wheel shown in Figure 3 includes a conventional hub 20 having secured thereto through means of the rivets 21 and the cap screws 22 respectively, a brake drum 23 and a steel wheel indicated generally at 24. The steel wheel includes the wheel body portion 25 and a conventional form of drop center rim 26 secured to the periphery of the wheel body by means of the rivets 27. The rim 26 includes the substantially axially extending annular wall portions 28.

An ornamental cover 29 is positioned to conceal the wheel body 25. It is of generally conical formation having a continuous peripheral portion of a slightly greater diameter than the internal diameter of wall 28. The cover is sufficiently flexible to permit the peripheral edge portion thereof to be inserted within the annular wall 28 as shown in Figure 3. The necessary distortion of cover 29 to permit the insertion of the periphery thereof within the wall 28 is preferably effected by the exertion of a radially and axially inward pressure in the region of the reverse curve formed adjacent the periphery thereof.

Preferably after the cover 29 has been pressed into engagement with the annular wall 28 of rim 26, the rim is provided with a plurality of depressions 30 in the wall 28 outwardly of the edge of cover 29 to permanently secure the cover to the rim. If it is not desired to permanently secure the cover to the rim, but it is desired to positively insure against accidental dislodgement of the cover from the wheel, the rim may be initially provided with projections 30 of limited radial extent. The cover 29 is then installed upon the wheel by distorting the peripheral edge thereof sufficiently to permit the same to pass over the projections 30. Once the edge portion of the cover 29 is located behind the projections 30 its natural tendency to assume its normal diameter securely locks the same in position on the rim.

The cover 29 is preferably provided with a large central opening adapted to receive the conventional hub cap 31 as shown.

A still further modified manner of attaching the cover to a rim is shown in Figure 5. As there shown a generally conical cover 32 is secured to the axially extending wall portion 33 of a conventional drop center rim 34. The cover includes an axially extending annular peripheral portion 35 deformed adjacent its outer extremity to provide a radially extending bead 36.

The annular wall 33 is provided at spaced intervals throughout its circumference with radially inwardly extending projections 37. The outer diameter of bead 36 is slightly greater than the internal diameter of the annular wall 33 of rim 34. The cover 32 is sufficiently flexible to permit the insertion of the bead 36 within the annular wall 37 and over the projections 37. The flexibility of annular peripheral flange 35 of cover 32 may be increased by providing a plurality of openings 38 corresponding in location and number to the projections 37 whereby to facilitate the insertion of the bead 36 within the wall 33 and over the projections 37.

While only certain illustrative embodiments of the invention have been shown and described herein, it will be obvious to those skilled in the art that various other modifications are possible within the spirit of the invention and the scope of the appended claims.

We claim:

1. A vehicle wheel including, in combination, a rim having a substantially axially extending annular wall and a wheel and hub cover of generally conical formation having a continuous peripheral portion of a diameter slightly greater than the internal diameter of said annular wall, said cover adapted to be distorted sufficiently to permit the insertion of its peripheral edge portion within said annular wall whereby to secure the cover to the rim.

2. A vehicle wheel including, in combination, a rim having a substantially axially extending annular wall and a cover of generally conical formation having a continuous peripheral portion of a diameter slightly greater than the internal diameter of said annular wall, said cover adapted to be distorted sufficiently to permit the insertion of its peripheral edge portion within said annular wall whereby to secure the cover to the rim, and means carried by the rim for preventing accidental dislodgement of the cover after it has been inserted within the said annular wall.

3. A vehicle wheel including, in combination, a rim having a substantially axially extending annular wall and a cover of generally conical formation having a continuous peripheral portion of a diameter slightly greater than the internal diameter of said annular wall, said cover adapted to be distorted sufficiently to permit the insertion of its peripheral edge portion within said annular wall whereby to secure the cover to the rim, said annular wall of the rim provided with a radial projection adapted to engage the peripheral portion of the cover when inserted within the wall to prevent the accidental dislodgement of the cover.

4. A vehicle wheel including, in combination, a rim having a substantially axially extending annular wall and a cover having a continuous peripheral edge positioned within and engaging said annular wall, the normal diameter of the peripheral edge of the cover being greater than the internal diameter of the rim, the engagement of the peripheral edge of the cover with the inner surface of said annular wall constituting the sole means for securing the cover to the rim.

5. A vehicle wheel including, in combination, a rim having a substantially axially extending annular wall and a cover of generally conical formation having a continuous peripheral portion reversely curved outwardly from the surface thereof and of a diameter slightly greater than the internal diameter of said annular wall, said cover adapted to be distorted sufficiently to permit the insertion of its peripheral edge portion within said annular wall whereby to secure the cover to the rim.

HAROLD G. AXTMANN
HARRY J. HORN.